United States Patent
Young et al.

(10) Patent No.: US 8,400,625 B1
(45) Date of Patent: Mar. 19, 2013

(54) GROUND SUPPORT EQUIPMENT TESTER FOR LASER AND TRACKER SYSTEMS

(75) Inventors: Daniel D. Young, West Melbourne, FL (US); Dharmesh G. Panchal, West Melbourne, FL (US); Alan A. Rakes, Palm Bay, FL (US)

(73) Assignee: DRS RSTA, Inc., Dallas, TX (US)

( * ) Notice: Subject to any disclaimer, the term of this patent is extended or adjusted under 35 U.S.C. 154(b) by 0 days.

(21) Appl. No.: 13/457,208

(22) Filed: Apr. 26, 2012

(51) Int. Cl.
G01B 11/26 (2006.01)
G01J 5/02 (2006.01)

(52) U.S. Cl. ............... 356/153; 356/4.01; 356/152.1; 356/152.3; 250/342

(58) Field of Classification Search .......... 356/138, 356/153, 614–623, 4.02, 152.11, 139.04, 356/141.3–141.5, 152.1; 250/504 R, 495.1, 250/330, 339.05, 252.1, 203.3, 341.6
See application file for complete search history.

(56) References Cited

U.S. PATENT DOCUMENTS

| | | | |
|---|---|---|---|
| 3,857,042 A | 12/1974 | LaGrange et al. | |
| 4,021,662 A | 5/1977 | Mimms | |
| 4,260,254 A | 4/1981 | Braun | |
| 4,385,834 A * | 5/1983 | Maxwell, Jr. | 356/153 |
| 4,422,758 A | 12/1983 | Godfrey et al. | |
| 4,432,640 A | 2/1984 | Grage et al. | |
| 4,446,363 A | 5/1984 | Lakin et al. | |
| 4,569,591 A * | 2/1986 | Ford et al. | 356/153 |
| 4,626,685 A | 12/1986 | Patalo et al. | |
| 4,649,274 A * | 3/1987 | Hartmann | 250/341.5 |
| 4,762,411 A * | 8/1988 | Pitalo et al. | 356/152.3 |
| 4,917,490 A | 4/1990 | Schaffer, Jr. et al. | |
| 4,975,573 A | 12/1990 | Girard | |
| 5,009,502 A | 4/1991 | Shih et al. | |
| 5,017,004 A | 5/1991 | Cross et al. | |
| 5,036,206 A | 7/1991 | Frank | |
| 5,047,638 A | 9/1991 | Cameron et al. | |
| 5,264,905 A | 11/1993 | Cavanagh et al. | |
| 5,282,014 A | 1/1994 | Ruhl, Jr. et al. | |
| 5,506,675 A | 4/1996 | Lopez et al. | |
| 5,734,466 A | 3/1998 | George et al. | |
| 5,872,626 A | 2/1999 | Lipscomb | |
| 6,072,572 A * | 6/2000 | Hatfield et al. | 356/152.3 |
| 6,266,198 B1 | 7/2001 | Lipscomb | |
| 6,734,448 B2 | 5/2004 | Kongable | |
| 7,184,136 B2 * | 2/2007 | McHugh | 356/152.3 |
| 7,636,154 B1 * | 12/2009 | LaValley et al. | 356/73 |
| 2003/0174315 A1 * | 9/2003 | Byren et al. | 356/152.1 |
| 2006/0093269 A1 * | 5/2006 | Willis | 385/52 |

* cited by examiner

Primary Examiner — Hoa Pham
(74) Attorney, Agent, or Firm — Kilpatrick Townsend & Stockton LLP (57) ABSTRACT

Systems, devices, and methods are disclosed for testing the boresight of a gimbaled camera and laser system, such as an infrared countermeasures (IRCM) system, in extreme environments. Light simulating a target is reflected through an optics system to the camera, with a portion of the light reflected back from a corner cube reflector through the optics system as a reference. A laser beam from the laser is received through the same optics system, and a position of the corner cube reflected reference and laser beam are compared in order to determine whether the camera and laser are properly aligned. A spherical shell adapted to position the camera at its geometric center keeps misaligned laser pulses from reflecting back into the camera.

21 Claims, 11 Drawing Sheets

GROUND SUPPORT EQUIPMENT TESTER FOR LASER AND TRACKER SYSTEMS

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

This disclosure is generally related to optics measuring and testing systems, and more specifically to a portable device for the flight-line boresighting of laser and imaging tracker systems. This disclosure is also generally related to laser safety systems, and more specifically to a novel shroud for the safe containment of a high power laser that is adjacent a sensitive imaging system.

2. Background

Guided missiles and bombs have been used for decades against aircraft, tanks, buildings, and bridges. The guidance sections for guided missiles and bombs often have seeker elements, mounted facing forward, which communicate inputs to fins or thrust vectoring mechanisms in order to steer. A seeker element "locks on" a target so that it follows the target if it moves in its field of view. Depending on the geometries, range, and carrier vehicles used, the guidance systems can lock on to a target before missile launch or bomb release, during the midcourse phase, or during the terminal engagement just before impact or fusing. Locking on to a target can be critical for aiming precision; therefore, it is no surprise that defenses to such weapons have employed countermeasures to dazzle, draw off, or otherwise confuse the seekers.

As technology has progressed over the years, seeker elements have been known to use radar, infrared, laser, optical tracking, or other methods to determine the location of and lock on their targets. Active countermeasures to such seekers employ waveform generators, chaff, flares, and other electronic countermeasures. Besides unidirectional countermeasures, directional countermeasures such as flash lamps, lasers, and other directed energy means have been developed. Each of these directed energy countermeasures is intended to be pointed at an incoming missile or bomb in order to confuse its seekers. Because closing velocities are often very fast, detection of an inbound target and pointing of such directed devices should be automated. Because high power directed energy beams are relatively narrow, their pointing should be highly accurate.

Infrared countermeasures (IRCM) systems are devices designed to protect aircraft from infrared homing missiles, sometimes called heatseeking missiles. They do so by confusing the missile guidance systems with a saturating beam of infrared light, typically from an infrared laser. A typical IRCM system consists of a primary imaging system (tracker) along with various laser systems that perform jamming, range finding and target designation. The performance of these subsystems should be periodically maintained during the operation of the IRCM system in order to insure that the IRCM system will work as intended at the critical time. For example, a laser in an IRCM system should be aligned to the center of the field-of-view of the primary imaging systems (tracker) such as a forward looking infrared (FLIR) camera, visible television (TV), or direct-view optics.

Few devices have been developed to simultaneously measure laser and imaging performance of ICRM systems, including measuring laser boresight, average power, pulse width, imager tracking target acquisition and lock, and field-of-view centroid to laser boresight. And the few devices that have been developed were apparently designed and intended for use at room temperature in a laboratory measurement station, at a factory test station, or in a similarly environmentally controlled depot test facility. This makes sense because testing in controlled temperatures and out of the weather can ensure the tightest alignment to standards and ensure safety of operators. The precision of these countermeasures can mean the difference between life and death.

Yet, a need exists for more accurate boresighting test equipment for ICRM and other countermeasure systems.

BRIEF SUMMARY

The inventors have identified a need for boresighting test equipment that can be realistically and accurately tested while a unit under test (UUT) is moving and searching for a target. This allows substantially all of the functions of some UUTs to be tested. These presently cannot be tested in the field for fears related to the laser inadvertently firing. These function tests include sensor movement and search for a target, target detection and acquisition, target signature analysis and lock-on, decision to command firing the laser, verification the laser actually fired, and measurement of laser parameters such as power, pulse width and boresight.

Generally, systems, devices, and methods of the present invention are related to test equipment that precisely boresights a camera and laser together in a unit under test (UUT) system. Within the test equipment, a single mirror system receives incoming light from the UUT laser as well as directs output light for a simulated target to the UUT camera. A corner cube reflector—which has the property of reflecting light in the direction from whence it came and being relatively insensitive to all angular and translational motion—reflects a portion of the simulated target light back through the mirror system, and a focus position of this reflected light and the incoming laser light are compared. Based on this position comparison, a field testing crew can adjust the UUT camera and/or laser or issue a simple go/no-go for the UUT.

Systems, devices, and methods of the present invention are also related to a novel laser safety shroud that uses reflective geometry to prevent a misaligned high-power laser from reflecting back into an adjacent camera in a UUT. A spherical dome enclosure is placed so that a gimbaled UUT's axes of tilt and yaw are positioned at the geometric center of the sphere. The UUT camera, which is usually pointed along the axis of tilt, is protected from both specular reflections that cause optical damage and diffuse (scattering) reflections that cause detector saturation and loss of lock. The direct specular reflections are offset from the UUT camera due to the reflective geometry of the spherical portion. The diffusely scattered power is kept below the UUT camera saturation level by selecting a spherical portion with an inherently very-low diffuse coefficient of reflection.

Some embodiments of the present invention are related to a laser and imager boresight test apparatus. The apparatus includes a housing having an input aperture and an output aperture, a simulated target light source, an imaging array, one or more optical elements configured to direct an input beam entering the input aperture to a first point on the imaging array, the one or more optical elements configured to collimate light from the light source and direct at least a portion of the collimated light through the output aperture as an output beam, and a corner cube reflector located proximate to the output aperture and configured to reflect a portion of the light from the light source back through one or more optical elements to a second point on the imaging array. A difference between locations of the first and second points on the imaging array indicates an angular difference between the input beam and output beam.

Some embodiments are related to a method of measuring an alignment between a simulated target and a laser. The method includes generating an output light beam from a light emitter, the output light beam simulating a target, reflecting the output light beam through an output aperture on a housing via a light reflector and a beam splitter, reflecting a portion of the output light beam to a point on an imaging device via a corner cube reflector, the light reflector, and the beam splitter, receiving an input light beam through an input aperture on the housing, and reflecting the input light beam to a point on the imaging device by the light reflector and the beam splitter.

Some embodiments are related to a laser safety shroud apparatus. The apparatus includes a spherical wall portion having at least one aperture and a mount structure connected with the spherical wall portion and adapted to connect with a gimbaled unit under test (UUT) having an axis of tilt. The mount structure is adapted to co-locate the axis of tilt with a geometric center of the spherical wall portion Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention.

DETAILED DESCRIPTION

Generally, real-world IRCM systems should be independently tested or verified in the field. For example, an IRCM system for a helicopter should be tested on a flight line, out in the same weather elements in which the system is supposed to operate. The result of the testing can inform a "go/no go" decision for a mission. Key performance functions for a go/no-go decision can include tracker lock and acquisition, laser fire and average power, and boresight alignment of a laser to a tracker. If the IRCM system fails the flight line test, then it may have a bearing on whether the helicopter is flown in a particular mission. The development of field-support test equipment and methods for use on IRCM systems that are capable of determining a go/no-go verification has become increasingly important as more such advanced integrated imaging and laser systems are being fielded by the U.S. and foreign militaries. Embodiments of the invention can independently test IRCM and like systems.

Technical advantages of the invention over the prior art are many. Previous IRCM device testing systems were not opto-mechanically athermalized, largely limiting their calibrations to indoor use. Further, while some IRCM device testing systems have been compact enough to be portable, little if any accommodation has been made to use them mounted to a vehicle in an operationally harsh and widely fluctuating temperature range, with and during vibration or after shock while the measurement is taking place. Previous IRCM systems have largely been fixed during field test and not allowed to move or have laser firing activated. This means that the critical functions such as target search, target detection, target signature analysis, decision to lock-on, target tracking, decision for laser fire command and verifications whether the laser can, indeed, actually fire and the laser performance (e.g., power and boresight) meets mission requirements cannot feasibly be determined by previously known field testing units.

Previous IRCM systems use laser wavelengths outside the wavelength band of the primary viewing optic. Therefore, laser backscatter from the IRCM device testing systems into the primary viewing optic, whether direct (e.g., specular reflection) or indirect (e.g., diffuse reflection), has not been seen as a design performance consideration of the IRCM device testing systems. Recently, IRCM systems have begun to use laser wavelengths in the wavelength band of the primary viewing optic. Thus, the current IRCM device testing systems apparently do not address the problem of preventing laser damage or saturation—causing loss of lock—to the IRCM detector in the primary viewing optic of the test system caused by laser backscatter from the calibration system itself. In addition, IRCM device testing systems do not adequately address operator eye safety or the containment of the laser beam during testing.

The inventors have recognized that previous IRCM device testing systems separate alignment sources from the target simulator source in order to act as a reference source for system calibration. Typically, the reference source is imaged at the focal plane of a collimating optic by a detector array. Optical alignment is measured by comparing the laser point image to the point image of the reference source on the detector array resulting in a measurement of the angular difference between the laser and reference. The reference has previously been aligned to the target source. Measurement errors undetectable during the measurement time may occur if the reference source and the target source become misaligned by temperature changes, vibration, physical shock, or all of the above combined in the test equipment. Therefore, current IRCM device testing systems are limited by potential errors caused by having a separate reference source from the target source.

One embodiment provides an IRCM device testing system that is a portable optical device for field/flight-line support of an imaging tracker system aligned to laser subsystems. Consistent with this embodiment, the IRCM device testing system provides a simulated target to the tracker while simultaneously measuring the boresight of the laser to the tracker during the laser firing. An ingenious use of a corner cube reflector, which always reflects light back in the opposite direction, provides an extremely robust reference signal that resists thermal and vibration transients in the non-laboratory world. The IRCM device testing system includes a light-tight eye safety protection enclosure for a user that protects the eyes of the user while simultaneously preventing detector saturation, optical laser damage or loss of lock from laser power backscattered into the tracker through geometry.

The IRCM device testing system is a portable, rugged optical device that may be used as ground support test equipment for, but not limited to, reconnaissance surveillance targeting and acquisition systems, infrared countermeasures systems, infrared search and track systems, and target designation/rangefinder systems. Infrared countermeasures (IRCM) gimbaled devices are used for explanatory purposes herein, and one of ordinary skill in the art will realize how embodiments cover any range of systems with the disclosure herein.

Figure 1:
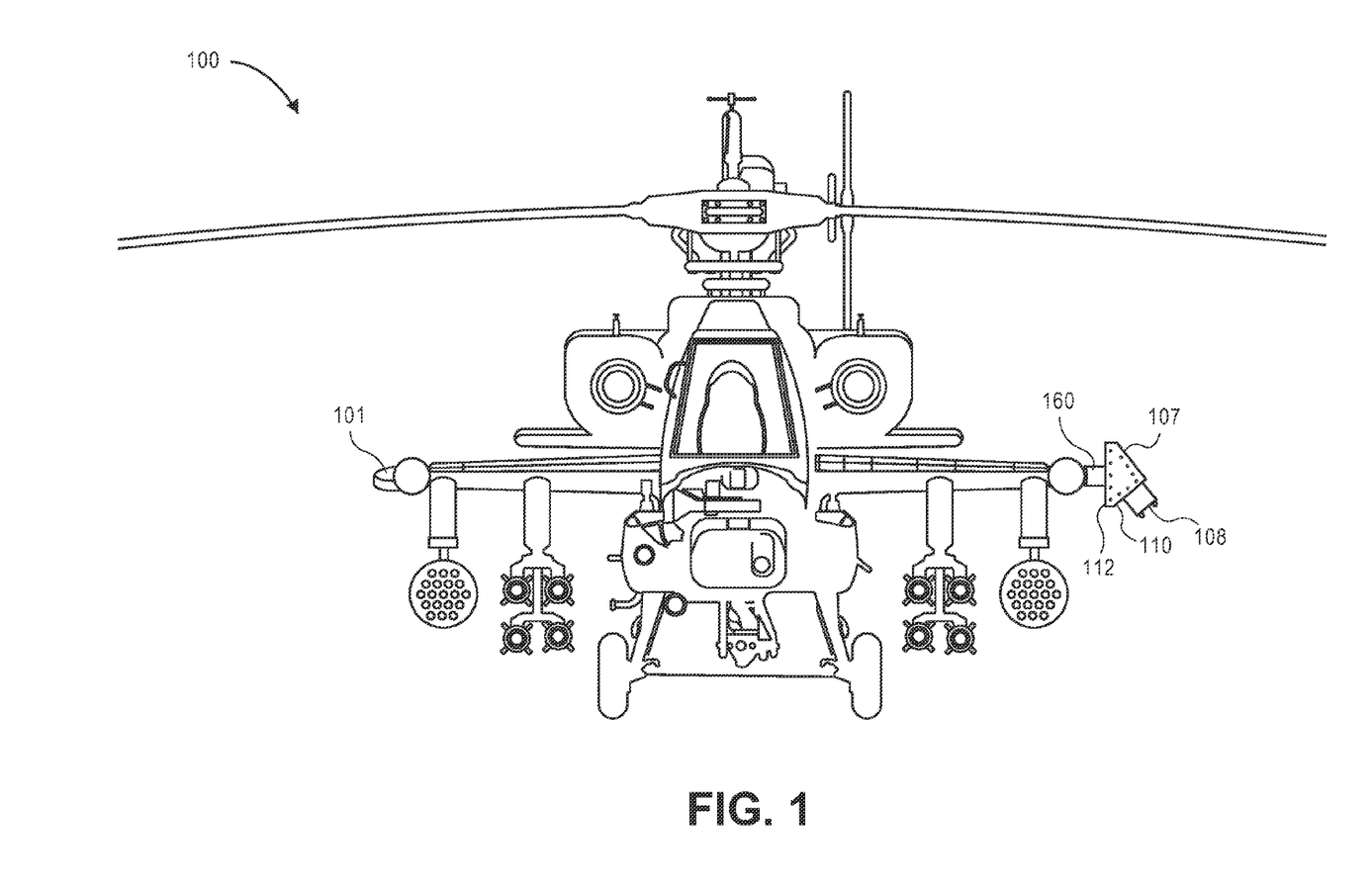
FIG. 1 illustrates two helicopter-mounted IRCM devices with one of the devices enclosed in a tester in accordance with an embodiment.

FIG. 1 illustrates two helicopter-mounted IRCM devices, with one of the devices exposed, and the other device enclosed in a tester in accordance with an embodiment. Exposed IRCM device 101 is mounted on the starboard side of helicopter 100. Another IRCM device is mounted on the port side of the helicopter and is covered by testing system 107. Testing system 107 includes cylinder 160, interface plate 112, eye safety unit 110, and core testing unit 108. Cylinder 160 surrounds the port-mounted IRCM device for eye safety and attaches to interface plate 112. Interface plate 112 connects to eye safety unit 110, and eye safety unit 110 holds core testing unit 108 at an angle for testing. Essentially, cylinder 160 and interface plate 112 position the eye safety unit and core tester at the proper locations and orientations with regard to the gimbaled IRCM device.

Directed countermeasure devices can be mounted to vehicles such as aircraft, ships, helicopters, land vehicles, spacecraft, or other pieces of support equipment. The vehicle connected to the IRCM device typically provides power to the IRCM device. In the exemplary embodiment of FIG. 1 the IRCM devices are powered by the helicopter.

Figure 2:
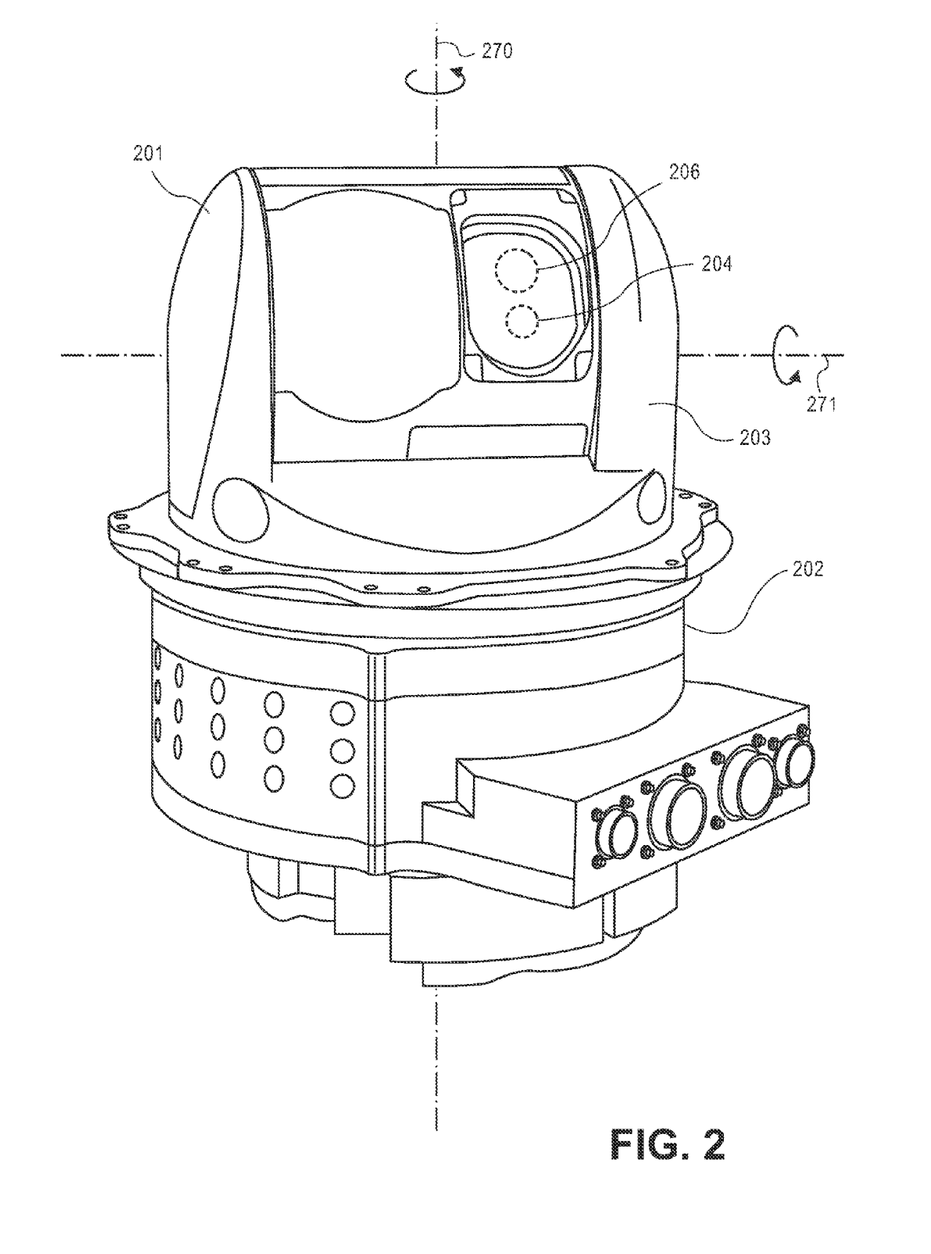
FIG. 2 illustrates a close-up of an IRCM device.

FIG. 2 illustrates an IRCM device. IRCM device 201 includes base portion 202 positioned below an upper portion 203. Upper portion 203 rotates in relation to base portion 202 around yaw axis 270. Upper portion 203 includes firing laser unit 204 optically coupled to a firing laser optical aperture and imaging tracker unit 206 optically coupled to the imaging tracker optical aperture. Firing laser unit 204 and imaging tracker unit 206 are configured to rotate vertically and horizontally in relation to base unit 203. They rotate horizontally around tilt axis 271. In the exemplary embodiment, firing laser unit 204 and image tracker unit 206 are able to rotate 360 degrees in relation to an axis perpendicular to base unit 203 and may rotate 180 degrees in relation to an axis parallel to base unit 203. Firing laser unit 204 and adjacent imaging tracker unit 206 rotate simultaneously.

Imaging tracker unit 206 is configured to "lock on" to a potential target by detecting a natural emission signature of the target. In one embodiment, the natural emission signature is a heat signature. Consistent with this embodiment, "lock on" includes identifying a target by the measured natural emission signature of the target and identifying at least one characteristic to indicating the position of the target relative to the targeting device, or as otherwise known in the art. After imaging unit 206 "locks on" to the target and confirms the natural emission signature of the target, firing laser unit 204 emits a laser light in the direction of the target. The laser light emitted from firing laser unit 204 prevents the target from perform its intended function.

Imaging tracker unit 206 is configured to measure a light wavelength emitted from the target including, but not limited to, infrared light, ultraviolet light, near ultraviolet light, short wavelength infrared, or any other detectable wavelength of electromagnetic radiation reflected and/or emitted from the target.

Figure 3A:
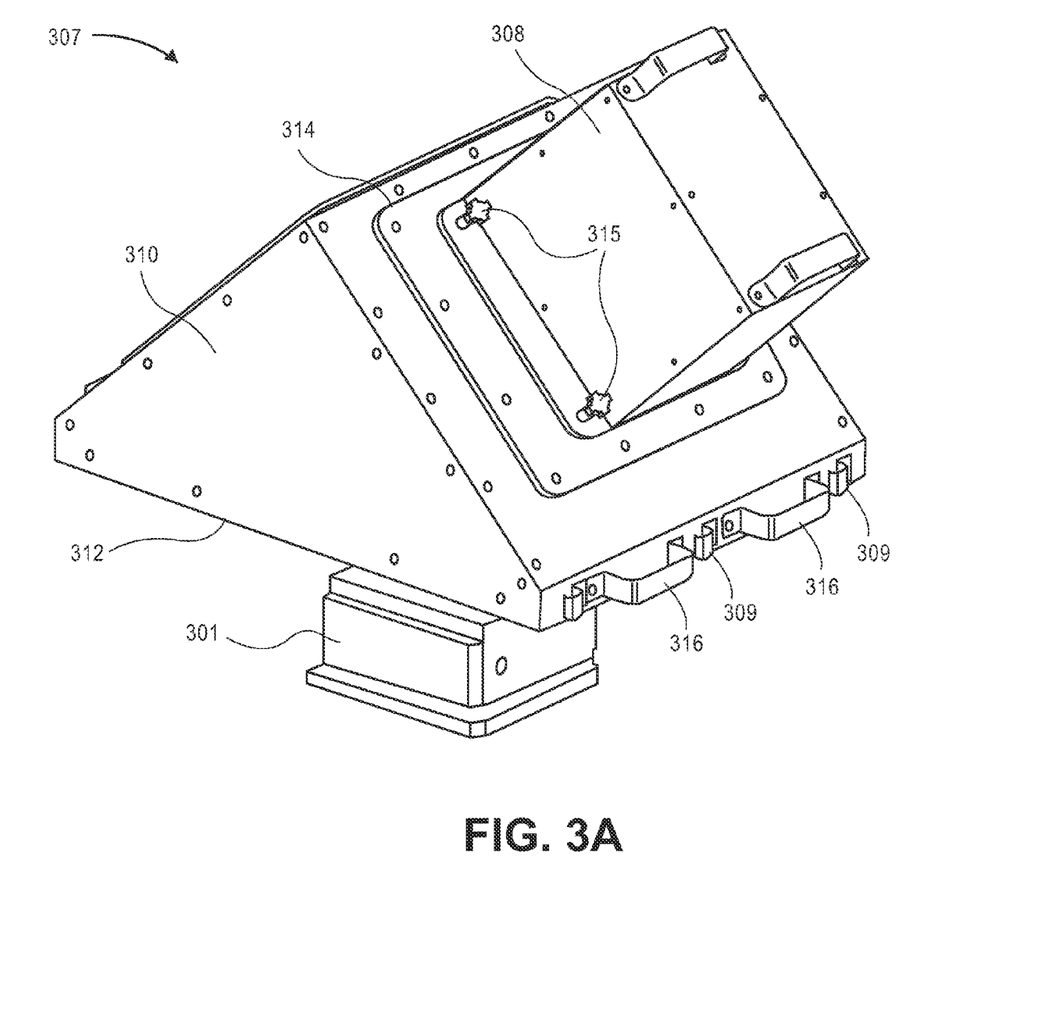
FIG. 3A illustrates a tester in accordance with an embodiment.

FIG. 3A depicts an embodiment of an IRCM device testing system. Interface plate 312 connects testing device 307 to the IRCM unit under test (UUT) 301. The lower portion of interface plate 312 attaches to a vehicle structure through a cylinder or other shroud (not shown in the figure), providing a light-tight interface. Once connected, UUT 301 is free to move within the testing system 307. Testing system 307 includes core testing unit 308 attached to eye safety unit 310. In one embodiment, the application of testing system 307 determines the size and shape of interface plate 312.

Testing system 307 also includes a plurality of handles 316 affixed to the lower portions of eye safety unit 310 as well as latches 309 that allow eye safety unit 310 to detach from interface plate 312.

Core testing unit 308 is attached to eye safety unit 310 by interface unit 314 and knobs 315 such that the distance and angular position of core testing unit 308 with respect to UUT 301 is fixed. In particular the location of an input aperture and an output aperture in core testing unit 308 are to match a position of a laser (e.g., firing laser unit 204 in FIG. 2) and an infrared camera (e.g., imaging tracker unit 206 in FIG. 2).

In an embodiment, multiple core testing units can be located on the eye safety unit, with each location corresponding to a position/orientation of the firing laser unit and the imaging tracker unit. For example, another core testing unit can be located on the other side of the slanted 'roof,' so that two targets are visible to the UUT's simultaneously. This can help test the UUT at different gimbal positions if that were a factor.

In one embodiment, power is provided to testing system 307 using an external power supply, and a vehicle or a building provides power to UUT 301. Battery power can also be used to power testing system 307.

Figure 3B:
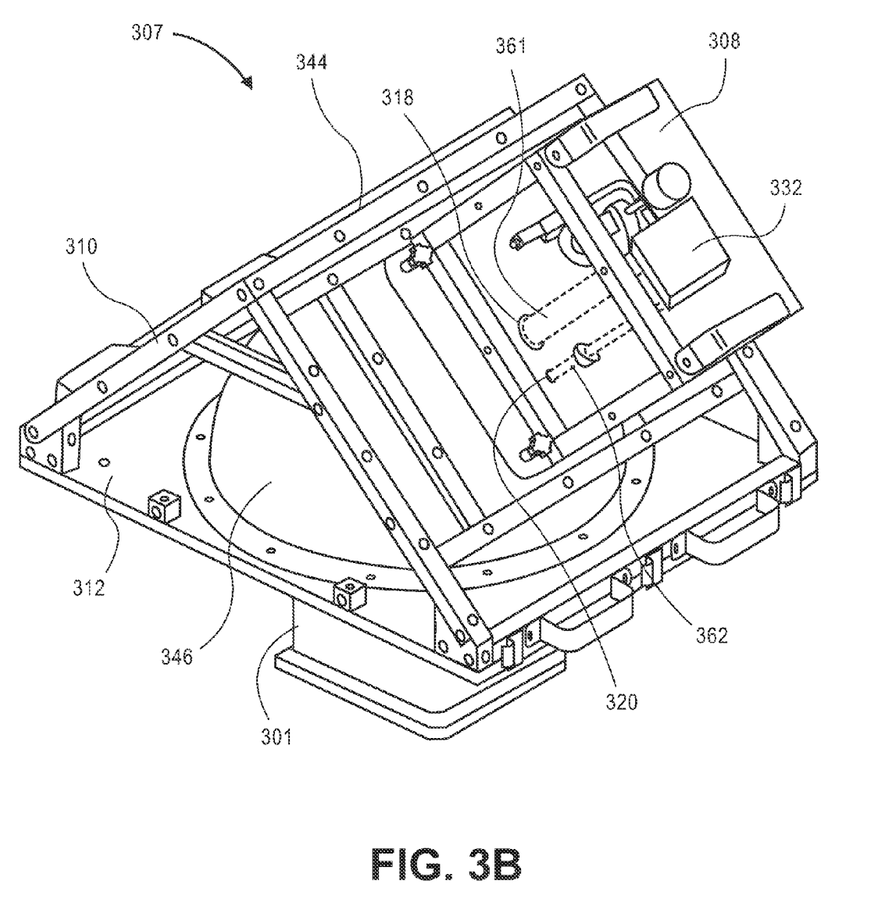
FIG. 3B illustrates a cutaway view of the tester of FIG. 3A.
Figure 3C:
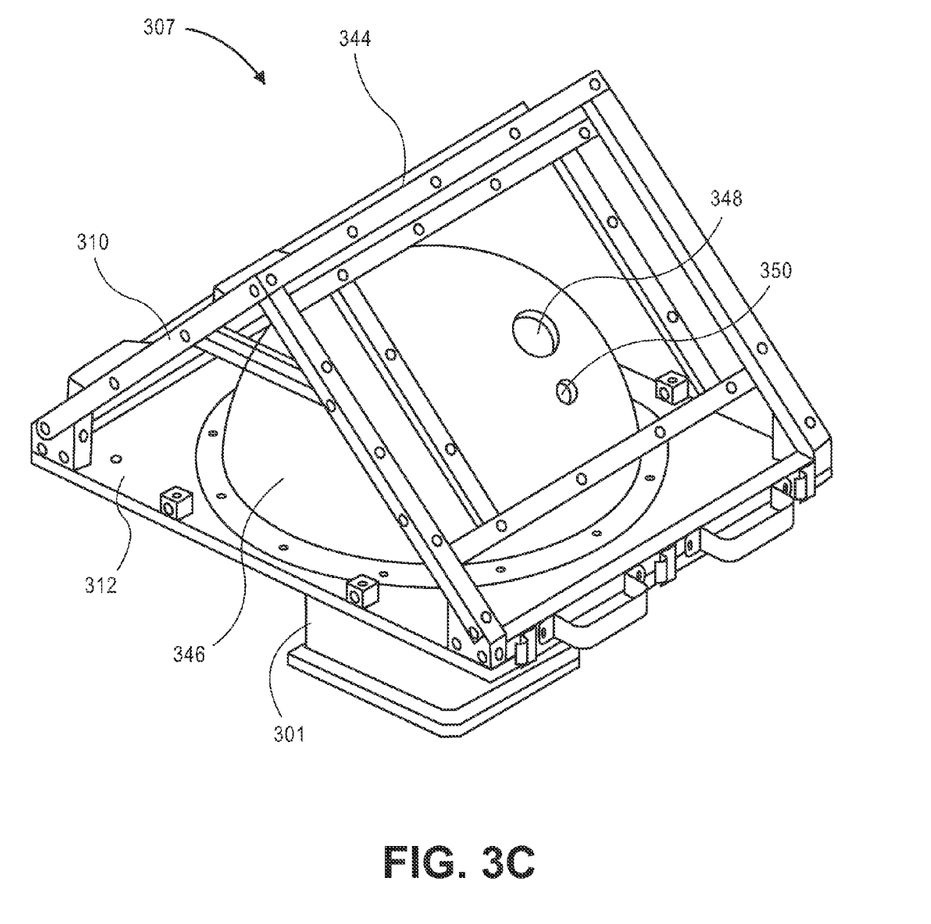
FIG. 3C illustrates a cutaway view of the tester of FIG. 3B with its core tester removed for illustration.

FIG. 3B illustrates a cutaway view of the tester of FIG. 3A. FIG. 3C illustrates the cutaway view of FIG. 3B but with core tester 308 walls removed. In both figures, eye safety unit 310 includes frame 344, which houses spherical dome unit 346 affixed to interface plate 312.

Within core testing unit 308, output beam 361, which simulates a target, is reflected from its light source off of primary mirror 332 into dome 346. Input laser beam 362 from UUT 301 enters core testing unit 308 and reflects off of the same primary mirror, primary mirror 332.

Openings 348 and 350 (see FIG. 3C) in dome 346 align with an imaging tracker unit and firing laser unit, respectively, via alignment with core tester openings 318 and 320 (see FIG. 3B).

Figure 4:
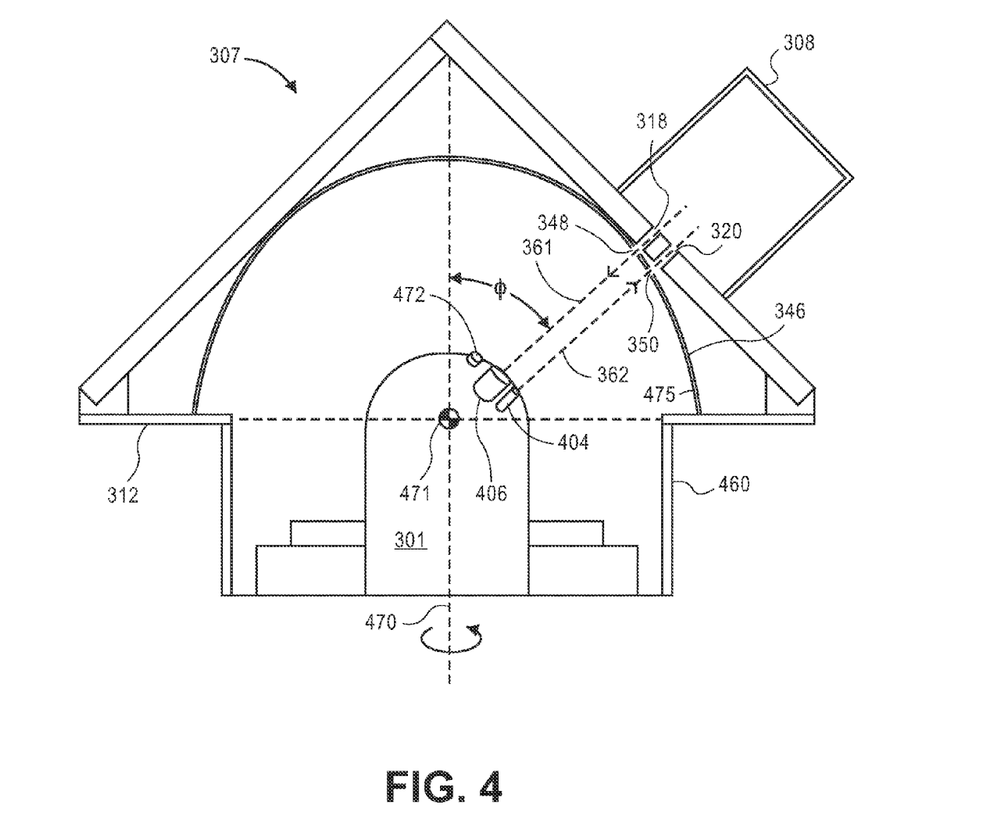
FIG. 4 illustrates a cross section of a tester in accordance with an embodiment.

FIG. 4 illustrates a cross section of a tester in accordance with an embodiment. UUT 301 is surrounded by cylinder 460 with interface plate 312 mating it to dome 346.

Cylinder 460 and interface plate 312 position spherical dome 346 such that the spherical dome's geometric center is collocated with axis of tilt 471 of UUT 301. That is, the geometric center is on the axis of tilt. Because UUT imager 406 is aligned radially from the axis of tilt, imager 406 is also aligned radially with spherical dome 346. In the exemplary embodiment, the camera is tilted at angle ϕ with respect to a centerline of the UUT.

In this embodiment, mount structure 460 and interface plate 312 position spherical dome 346 such that its geometric center is collocated with UUT yaw axis 470.

Simulated target beam 361 exits core testing unit 308 through aperture 318 and through aperture 348 into dome 346. Beam 361 travels toward the geometric center of spherical dome 346, along a radial line to imager 406. Imager 406 locks on to the simulated target and, when armed, fires associated laser 404.

UUT laser beam 362 travels from laser 404 into dome 346, slightly offset from a radial line. Laser beam 362 travels through aperture 350 in dome 346 and aperture 320 to enter core testing unit 308.

By construction, openings 348 and 350 align with the openings 318 and 320 in core testing unit 308. During test, the alignment of openings 348 and 350 with the firing laser unit and the imaging tracker unit occur at the position where the imaging tracker unit finds a simulated target and locks on to the simulated target. At all other angles, the imaging tracker unit is not intended to be locked onto a simulated target and continues to search for a target by rotating and scanning freely inside cylinder 460 and dome 346.

In the exemplary embodiment, dome unit 346 is shaped like a half sphere, having a constant radius and fixed geometric center. In another embodiment, the dome unit has a parabolic shape, having a constantly changing radius and an instantaneous center from each infinitesimal inner surface area.

Figure 5:
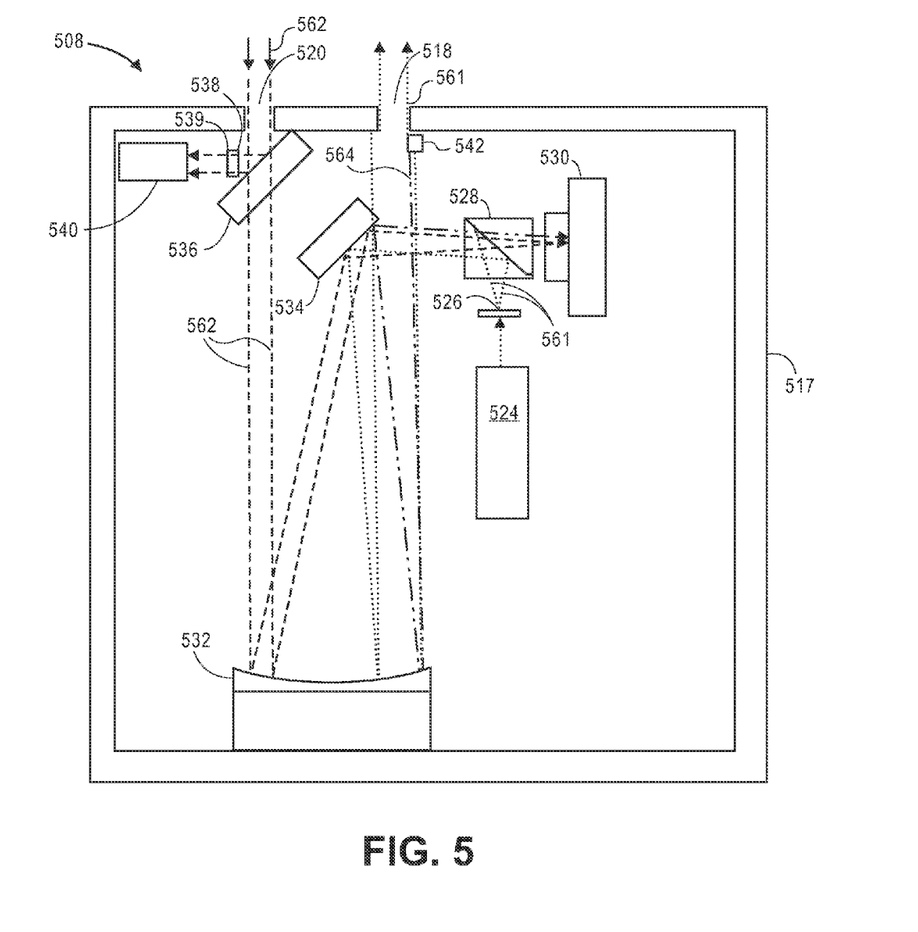
FIG. 5 illustrates a core tester in accordance with an embodiment.

FIG. 5 depicts a top view of the interior of the core testing unit 508. Core testing unit 508 includes housing 517, simulated target output aperture 518, firing laser input aperture 520, collimated light source 524 that illuminates pin-hole 526, cube beam splitter 528 on the output side of pin-hole 526, digital imaging device 530, fold reflector 534, and imaging reflector 532.

In one embodiment, the imaging reflector is a parabolic imaging reflector. In another embodiment, the imaging reflector is an off-axis parabolic reflector. In one embodiment, the imaging device is a digital camera.

Partially reflective fold reflector 536 is positioned between input aperture 520 and imaging reflector 532 such that a portion of an input beam passing through the input aperture 520 is directed through a density filter 538 to laser power metering unit 540. In one embodiment, fold reflector 536 has a very low transmittance and a very high reflectance. Density filter 538 is configured to reduce the energy of a light beam diverted by fold reflector 536.

In one embodiment, density filter 538 also includes a wavelength filter that removes background noise from a light beam reflected from the fold reflector 536.

Pin-hole 526 is positioned at the focal point of the imaging reflector 532 and is sized such that an exit angular subtense satisfies equation 1 below. In the exemplary embodiment, cube beam splitter 528 consists of two anti-reflection coated right angle prisms bonded together.

The collimated beam of light generated by pin-hole 526 operates at an angular subtense that matches a simulated targets defined by equation 1:

$$\theta = s/f \quad \text{(Eqn. 1)}$$

where θ is the angular subtense, s is the diameter of pin-hole 526, and f is the focal length of imaging reflector 532. Pin-hole 526 is placed at a distance f from the imaging reflector 532, taking into account the index of refraction of cube beam splitter 528. By selecting s and f, the correct angular subtense θ is obtained.

In the exemplary embodiment, an all-reflective telescope structure provides a common optical path between a light beam entering the input aperture and a light beam exiting the output aperture, which results in the optical path being insensitive to wavelength differences. The reflecting optics may include a Cassegrain reflector, Newtonian telescope, or other reflecting structure.

In the exemplary embodiment, the telescope structure is comprised of imaging reflector 532 and kick out reflector 534. In one embodiment, imaging reflector 532 and kick out reflector 534 are both mounted to a common optical structure that is made of a material having a coefficient of thermal expansion similar to the coefficient of thermal expansion of housing 517. This reduces errors caused by thermal changes, vibration, and shock.

Three main light beams propagate through the optical elements inside core testing unit 508.

Collimated light source 524 generates a light beam that illuminates pin-hole 526 on the output side of collimated light source 524. The light beam expands out from pin-hole 526 before the light beam enters cube beam splitter 528. This light beam is the simulated target beam 561. In the exemplary embodiment, cube beam splitter 528 is comprised of two prisms. In another embodiment, the cube beam splitter can be comprised of a cube having multiple reflective surfaces. In another embodiment a cube beam splitter can be replaced by a 45 degree partially transparent and partially reflective thin mirror. Cube beam splitter 528 directs light beam 561 to kick out reflector 534. Kick out reflector 534 reflects light beam 561 from cube beam splitter 528 to imaging reflector 532, which then reflects light beam 561, now collimated, through output aperture 518.

Before exiting housing 517, a portion of light beam 561 is reflected from corner cube reflector 542 as light beam 564. Corner cube reflector 542 is positioned in an overspill region around the outside of output aperture 518. The optical overspill occurs because light beam 561, before exiting housing 517, is larger than output aperture 518. That is, the very small corner cube reflector is placed in any portion of the circular overfill annulus in order to provide a reference beam that focuses on the camera focal plane. If the pinhole is properly aligned and focused, the overfill annulus will be uniformly bright and symmetric around the aperture, i.e., uniformly illuminated.

Light beam 564, having been reflected by the corner cube reflector 542, returns to imaging reflector 532, which reflects light beam 564 onto kick out reflector 534, which in turn reflects the light into cube beam splitter 528. Cube beam splitter 528 transmits light beam 564 to a point on the focal plane of imaging array 530.

In one embodiment, the focal plane of imaging device 530 is at a distance f from the collimating reflector 532, causing light beam 564 to be brought to focus at one conjugate focal point. In another embodiment, pin-hole 526 is the second conjugate focal point.

The focal point for light beam 564 is stored in computer memory included in imaging device 530 as the angular direction of output beam 561 leaving the output aperture 518. Because corner cube reflectors reflect light beams back along the direction from which the light beams were generated—independent of the input angle—the focal position of light beam 564 provides an accurate representation of the light beam 561. Accordingly, the angle of departure of light beam 561 is also the angle of arrival of light beam 564. The input/output relationship of corner cube reflector 542 is resistant to angular movement caused by thermal expansion, vibration, or shock between UUT and the device testing system.

Light beam 561 enters the eye shielding unit, where it is seen as a simulated potential target by the UUT camera. The UUT can search for, detect, acquire, and lock-on to the simulated target. The UUT, after evaluation of the target signature, can issue a fire command. In return, the laser firing unit of the UUT device fires light beam 562 towards the input aperture 520.

Light beam 562 enters input aperture 520. A portion of light beam 562 is diverted to density filter 538 by partially transmissive/reflective fold reflector 536 and passes into power metering unit 540. Partially transmissive/reflective fold reflector 536 is configured to divert a portion of input light beam 562 into power metering unit 540 and to transmit the remaining portion of input beam 562 onto imaging reflector 532.

Density filter 538 removes power from input light beam 562 such that neither power meter 540 nor imaging device 530 are saturated from the power of light beam 562. In one embodiment, the density filter also includes wavelength filter 539, which reduces background noise present in the portion of the light beam 562 reflected by fold reflector 536. In another embodiment, the wavelength filter is separate from the density filter.

Power measuring unit 540 measures the power of input light beam 562 incident to the surface of power metering unit 540. The transmission of the input aperture 520, the reflection coefficient of fold reflector 536, the transmission coefficient of density filter 538, and the calibration factor of power metering unit 540 are used to calculate the actual power of input light beam 562. Accordingly, the actual power of input light beam 562 can be compared to threshold values to prove a go/no-go determination based on the power of the light. In addition, receiving input light beam 562 confirms that light 561 from collimated light source 524 from the pin-hole 526 properly exited housing 517.

A portion of incoming light beam 562 is transmitted by partially transmissive/reflective fold reflector 536. That portion of light beam 562 is reflected by imaging reflector 532 towards kick out reflector 534. Kick out reflector 534 reflects light beam 562 towards beam splitter 528, which directs light beam 562 onto a surface of imaging device 530. Imaging device 530 stores the angular position of light beam 562 in its memory.

Imaging device 530 can then calculate the difference in angular coordinates between reference beam 564 and input light beam 562, which provides a measure of light beam 562 boresight error. This represents the error in the angle of light emitted from the firing laser unit by comparing the angular position of light beam 564 to the angular position of light beam 562, which are stored in the memory of imaging device 530. In this manner, the angular boresight error between light beam 562 and light beam 561 can be compared to the specified standards needed for mission performance to provide a go/no-go determination regarding the boresight retention of the unit under test.

In one embodiment, a computer having a memory and a processor receives the light beam positioning information from imaging device 530 and automatically, without direct human intervention, calculates the difference in angular coordinates between reference beam 564 and input light beam 562, which provides a measure of the light beam error via the computer software.

In one embodiment, the resolution and accuracy of the measurement of the input and output beams is determined by the focal length of the reflective telescope and by the pixel size and pitch of the camera.

In one embodiment, housing 517 is enclosed and sealed by a light tight cover. The front surface of housing 517 includes an interface unit that connects its core testing unit to the eye safety unit by means of knobs. Because all of the optical components are housed in a single unit, the accuracy of the measured components of the input and output beam angular position is increased.

Figure 6:
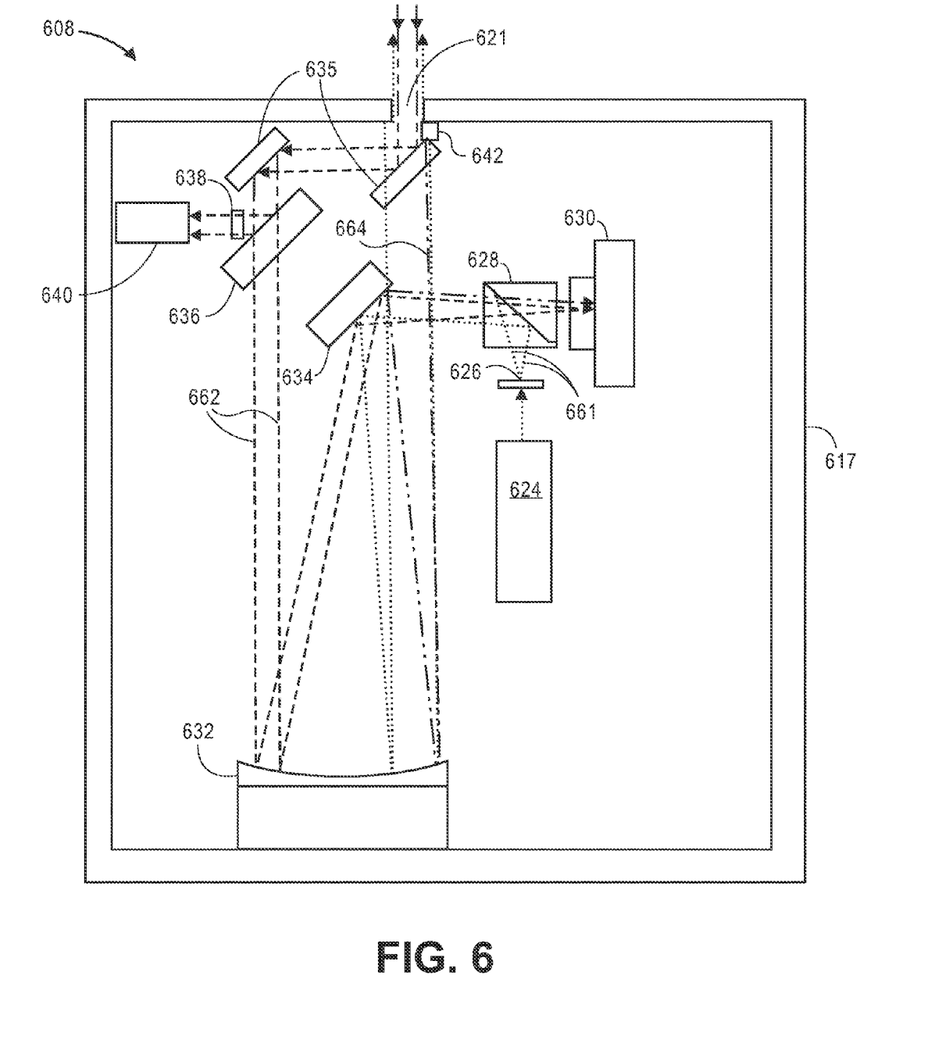
FIG. 6 illustrates an alternate core tester for a shared camera/laser aperture in accordance with an embodiment.

FIG. 6 depicts another embodiment of a core testing unit. Between FIGS. 5 and 6, like reference numbers between the figures have similar functionality. Consistent with this embodiment, the output aperture and input aperture are combined into a common aperture 621, which is optically aligned with a single firing/tracking unit on the UUT. That is, the input aperture and output aperture share the same opening. At least two fold reflectors 635 are located on one side of common aperture 521 and are positioned such that light beam 662 is diverted from common aperture 621 into beam splitter 628.

Fold reflectors 635 have first surface notch filter wavelength high specular reflectance and low diffuse coatings such that only light beam 662 is reflected from folding reflectors 635. In one embodiment, folding reflectors 635 are tilted at a 45 degree angle with respect to the incoming laser and are of high specular and low diffuse reflectivity. Accordingly, any reflected energy from light beam 662 that may propagate back into a firing laser resonator is below the spurious laser mode threshold which prevents laser or optical damage.

In one embodiment, the common aperture is coated with an antireflection coating and tilted from normal such that an amount of light beam 662 that may return to either the laser firing unit or imaging tracker unit is below the damage threshold for the laser firing unit or the image tracking unit. In another embodiment, density filter 638 and cube beam splitter 628 are tilted to prevent retro reflection. Consistent with this embodiment, power meter 640 is configured to completely absorb light beam 662. In addition, power meter 640 is tilted from normal to prevent any retro reflections. In yet another embodiment, antireflective coatings are applied to cube beam splitter 628, imaging device 630, and pin-hole 626 to prevent retro reflectivity. Cube beam splitter 628, imaging device 630, and pin-hole 626 may also be tilted to prevent retro reflections of the light beams.

A shear plate can be used for the alignment of the imaging system. A shear plate can be placed outside of the exit, output aperture of the core testing box. The shear plate provides an image of the interference fringe pattern of the exit beam to itself. This image is the size of the exit aperture. The pinhole is moved back and forth, left and right about its position in order to find a focus and provide for uniform illumination. When this condition is found (by trial and error), the image of the interference pattern will ideally have very dark and parallel lines on it. Also, the return beam from the corner cube reflector will be in focus as displayed on the imaging camera. If it is not in focus, then the camera is moved back and forth until the point is sharp.

Figure 7A:
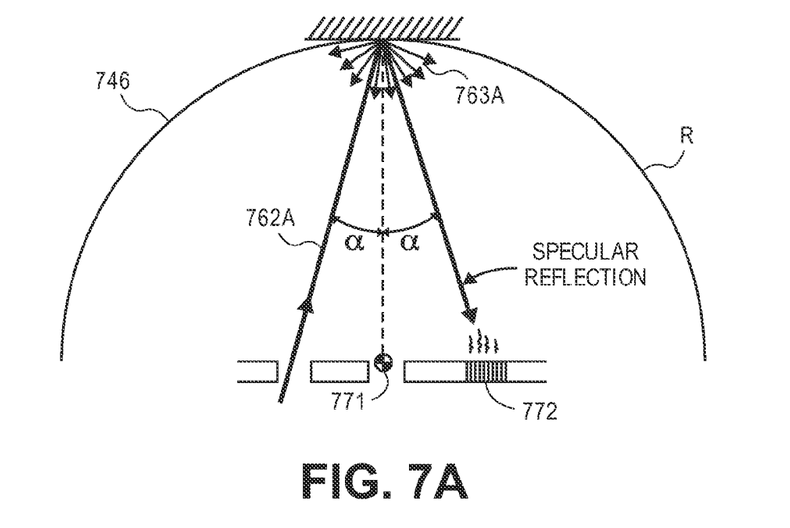
FIG. 7A illustrates reflectance within a spherical dome in accordance with an embodiment.
Figure 7B:
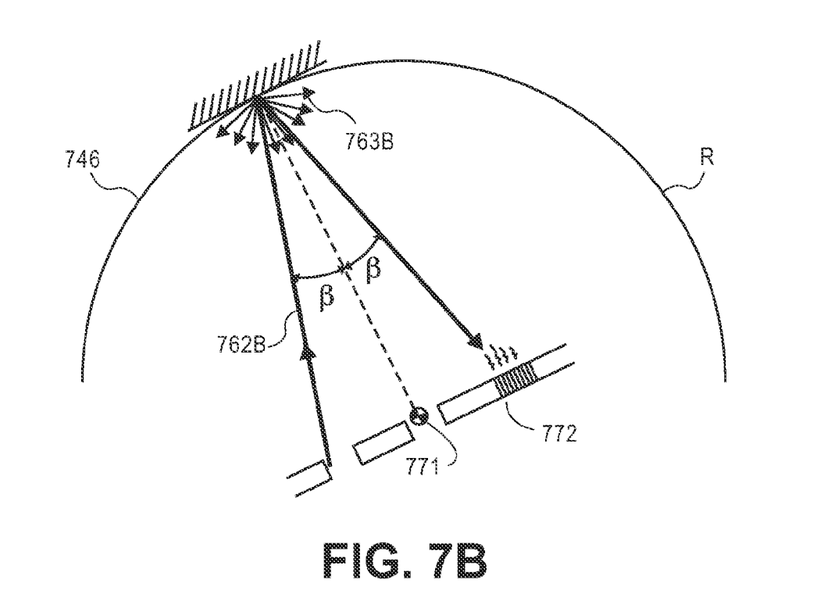
FIG. 7B illustrates reflectance within a spherical dome in accordance with an embodiment.
Figure 7C:
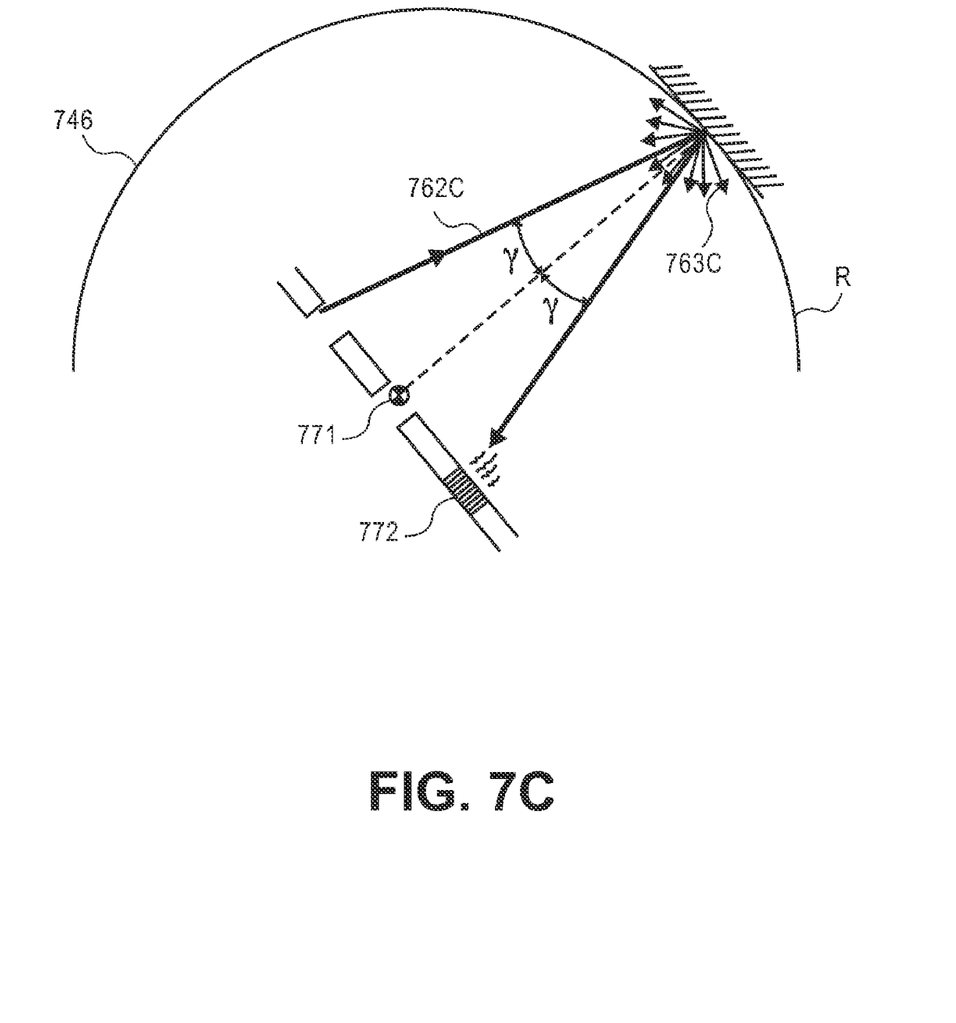
FIG. 7C illustrates reflectance within a spherical dome in accordance with an embodiment.

FIGS. 7A-7C illustrate specular and diffuse reflectance within a spherical dome in accordance with an embodiment. These figures demonstrate that a laser beam that is offset from the geometric center of a spherical dome will not reflect to the geometric center. This property can be used to protect a sensitive camera system from specular reflections by an adjacent laser as shown in the exemplary embodiments. The sensitive camera is protected from saturation by the diffuse reflectance by the selection of the diffuse reflectivity of the spherical dome to be very, very low and the specular reflectivity to be very, very high.

FIG. 7A shows laser beam 762A traveling through hemisphere 746. Laser beam 762A is offset from a geometric center 771 of hemisphere 746. As shown, laser beam 762A reflects off of a wall of the sphere at an equal an opposite angle from which it hit the wall. That is, laser beam 762A hits wall at angle α and reflects at angle α. As shown in the figure, the reflected laser beam travels to a point opposite geometric center 771 called the conjugate focal point 772. At this point, a beam dump can be located in order to attenuate the power of the beam and keep it from reflecting further.

FIGS. 7B and 7C show laser beams 762B and 762C traveling through hemisphere 746 at different angles. Laser beam 762B hits spherical wall 746 at angle β and reflects at angle β. Laser beam 762C hits spherical wall 746 at angle γ and reflects at angle γ. No matter what the angle, the laser beam will reflect to conjugate focal point 772. In the case of a UUT that is positioned properly, i.e., the camera tilt point is at the geometric center of the spherical wall, angles α, β, and γ remain the same.

It can be shown that further reflections would not reach geometric center 771, even if there were no beam dump at conjugate focal point 772. The center of a sphere is essentially a reflective null point. This property holds true for purely specular reflections. Although diffuse reflections, such as diffuse reflections 763A, 763B, and 763C, scatter light in every direction and could illuminate the geometric center, diffuse light does not have the intensity of direct light.

The inventors have recognized that these properties can be useful for the laser safety of camera systems. Domes with highly reflective, gold-plated internal surfaces have been found to be effective in keeping military-grade lasers from firing back and damaging sensitive infrared cameras.

"Optically black" surfaces have been tested as well. A coating of a high performance optically black polymer is applied to the inside of the dome, and the polymer absorbs laser wavelengths. It has been found that current-technology optically black polymers can work in some situations.

A "low diffuse scattering" includes reflectivities of up to 0.001%, 0.002%, 0.003%, 0.004%, 0.005%, 0.010%, 0.015%, 0.020%, 0.025%, 0.1%, 1%, 2%, 3%, 4%, 5%, and 10% of light that is not reflected at an equal angle to that of non-grazing incoming light or as otherwise known in the art. For example, gold plating on a smooth surface can be said to have a low diffuse reflectivity.

A "high specular reflectivity" includes reflectivities of more than 99.9%, 99.8%, 99.7%, 99.6%, 99.5%, 99%, 98%, 97%, 96%, 95%, 90%, 85%, 80%, and 75% of light that is reflected at an equal angle to that of non-grazing incoming light or as otherwise known in the art. To continue with the above example, gold plating on a smooth surface can be said to have a high specular reflectivity.

Referring back to FIG. 4, the interior surface of dome unit 346 is coated with gold coating 475 that has low diffuse scattering and high specular reflective properties with little to no absorption such as, but not limited to, gold. Beam trap 472 can be place on UUT 301 at the conjugate focal point in order to collect any misfires of laser 404. That is, beam trap 472 is located opposite laser 404 from camera 406 and at the same distance from camera 406. If laser 404 is misaligned enough that its beam does not entirely go through aperture 350, the portion of light that is reflected back by the spherical portion of the wall surrounding aperture 350 will reflect to beam trap 472 and keep from reflecting into imager 406.

In a nominal use case for an embodiment, a ground crew screws the mounting structure and tester to a vehicle that carries the IRCM gimbal. The mounting structure and tester fully enclose the IRCM to contain stray laser pulses. A pilot then turns on and arms the IRCM gimbal so that it can go through its Built In Test (BIT) and other boot up procedures and begin searching. The gimbal rotates freely within the eye-safe dome searching 'the sky' for targets. The ground crew then activates the test equipment's simulated target so that a target is shown through the output aperture into the dome. The IRCM gimbal 'sees' the simulated target, locks on, and automatically fires its laser pulse to defeat the 'incoming target.' The position of the focused laser point is compared with the position of the focused reference target point (from the corner cube reflection), and the difference in these two positions indicates the angle between what the IRCM camera sees and its laser pulse. If the angle is within specifications, and the measurement from the laser power meter is sufficient, then the IRCM system can be deemed good to go. If the angle is outside the specifications, or if the measurement from the laser power meter is insufficient, then the IRCM system can be held as in-op. The tester can also test functions such as sensor motion, searching motion, target acquisition, target signature evaluations, decision to lock-on target, decision to give fire command, and whether the laser actually would fire and perform to specification (e.g., power and boresight).

Figure 8:
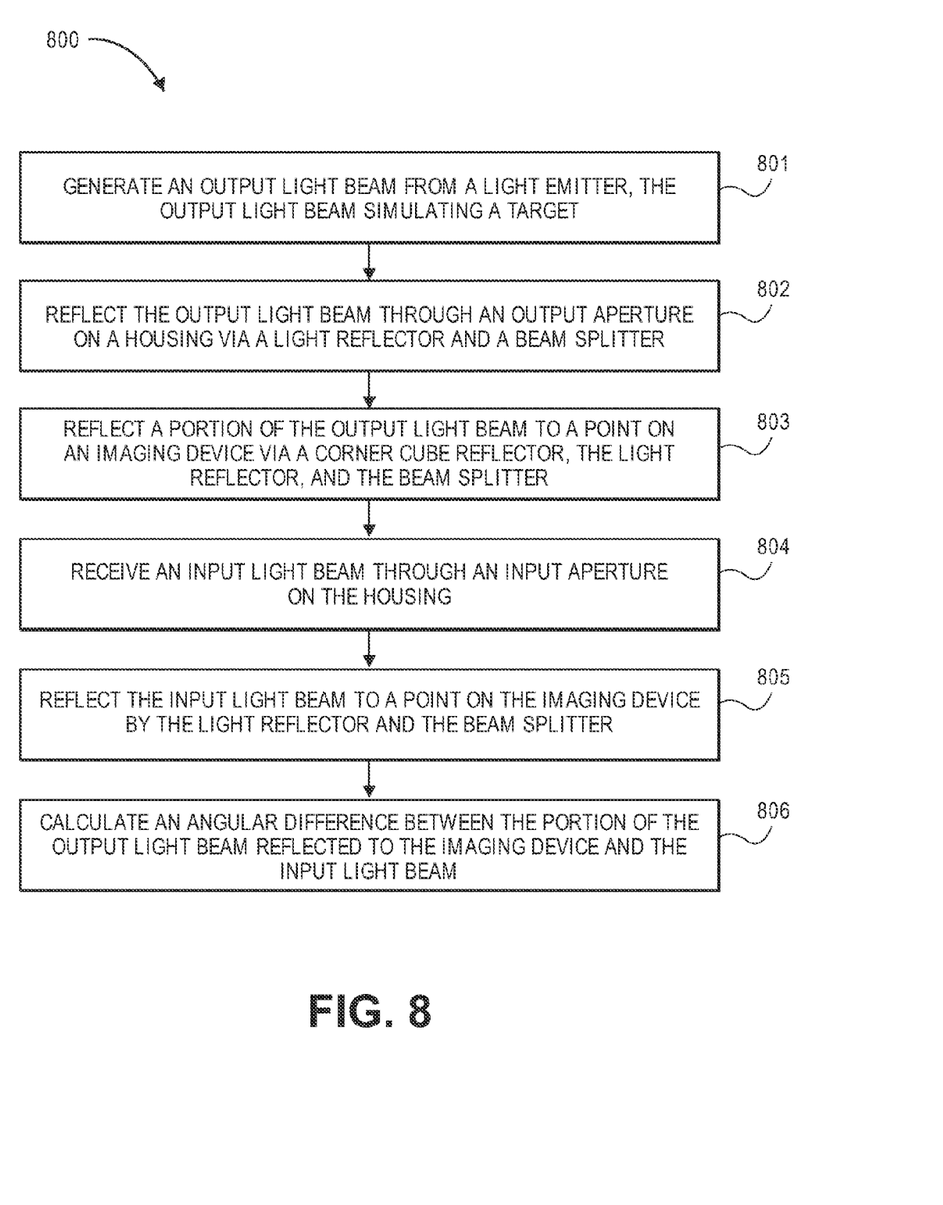
FIG. 8 is a flow chart of a process in accordance with an embodiment.

FIG. 8 is a flowchart of a process in accordance with an embodiment. Process 800 can be performed by an end user in a field or by others as appropriate. In operation 801, an output light beam is generated from a light emitter, the output light beam simulating a target. In operation 802, the output light beam is reflected through an output aperture on a housing via a light reflector and a beam splitter. In operation 803, a portion of the output light beam is reflected to a point on an imaging device via a corner cube reflector, the light reflector, and the beam splitter. In operation 804, an input light beam is received through an input aperture on the housing. In operation 805, the input light beam is reflected to a point on the imaging device by the light reflector and the beam splitter. In operation 806, an angular difference is calculated between the portion of the output light beam reflected to the imaging device and the input light beam. The operations can be performed in the order above or in different orders as applicable. The functions of laser power measurement and verification that the laser actually fired can be performed simultaneously with the operations above.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A laser and imager boresight test apparatus comprising:
a housing having an input aperture and an output aperture;
a simulated target light source;
an imaging array;

one or more optical elements configured to direct an input beam entering the input aperture to a first point on the imaging array, the one or more optical elements configured to collimate light from the light source and direct a first portion of the collimated light through the output aperture as an output beam; and a corner cube reflector located in an overspill region adjacent the output aperture and configured to reflect a second portion of the light from the light source back through one or more optical elements to a second point on the imaging array, wherein a difference between locations of the first and second points on the imaging array indicates an angular difference between the input beam and output beam.

2. The apparatus of claim 1 wherein the input aperture and output aperture share the same opening.

3. The apparatus of claim 1 further comprising:
a power meter; and
a reflector configured to direct a portion of the input beam to the power meter.

4. The apparatus of claim 3 further comprising:
a wavelength filter disposed between the laser power meter and the reflector, the wavelength filter adapted to remove background power from the input beam.

5. The apparatus of claim 1 further comprising:
a beam splitter configured to reflect a light from the light source to the one or more optical elements and allow the portion of light reflected from the corner cube reflector and the input beam to pass through the beam splitter to the imaging array.

6. The apparatus of claim 1 wherein the one or more optical elements comprise:
a concave primary mirror; and
a flat mirror,
the concave primary mirror and flat mirror in a Newtonian reflector configuration.

7. The apparatus of claim 1 wherein the one or more optical elements comprise:
a concave primary mirror; and
a convex mirror,
the concave primary mirror and convex mirror in a Cassegrain reflector configuration.

8. The apparatus of claim 1 wherein the one or more optical elements comprise:
one or more optically clear lenses.

9. The apparatus of claim 1 further comprising:
a processing unit adapted to receive point locations from the imaging array and calculate an angular difference between the input beam and output beam.

10. The apparatus of claim 1 wherein the light source is powered on and emitting light.

11. The apparatus of claim 1 wherein the input beam enters the input aperture.

12. The apparatus of claim 1 wherein the light from the light source is selected from the group consisting of infrared light, visible light, and ultraviolet light.

13. The apparatus of claim 1 further comprising:
a laser safety shroud including:
a spherical wall portion having at least one aperture, the at least one aperture aligned with the input aperture and output aperture; and
a mount structure connected with the spherical wall portion and adapted to connect with a gimbaled unit under test (UUT) having an axis of tilt,
wherein the mount structure is adapted to collocate the axis of tilt with a geometric center of the spherical wall portion.

14. A method of measuring an alignment between a simulated target and a laser, the method comprising:
generating an output light beam from a light emitter, the output light beam simulating a target;
reflecting a first portion of the output light beam through an output aperture on a housing via a light reflector and a beam splitter;
reflecting a second portion of the output light beam to a point on an imaging device via a corner cube reflector, the light reflector, and the beam splitter, the corner cube reflector located in an overspill region adjacent the output aperture;
receiving an input light beam through an input aperture on the housing; and
reflecting the input light beam to a point on the imaging device by the light reflector and the beam splitter.

15. The method of claim 14 further comprising:
calculating an angular difference between the portion of the output light beam reflected to the imaging device and the input light beam.

16. The method of claim 14 further comprising:
positioning a reflector between the light reflector and the input aperture to reflect a portion of the input beam into a power measuring unit.

17. The method of claim 16 further comprising:
removing background power from the input light beam by positioning a wavelength filter between the reflector and the power measuring unit.

18. The method of claim 14 wherein the light reflector includes an imaging reflector located in alignment with the input aperture and output aperture and a kick out reflector positioned between the imaging reflector and the beam splitter.

19. The method of claim 14 wherein the input light beam includes a laser beam.

20. The method of claim 14 wherein the input and output light beams are infrared beams.

21. The method of claim 14 further comprising:
connecting the input and output apertures to a dome-shaped light shading unit.

* * * * *